Figure 1:
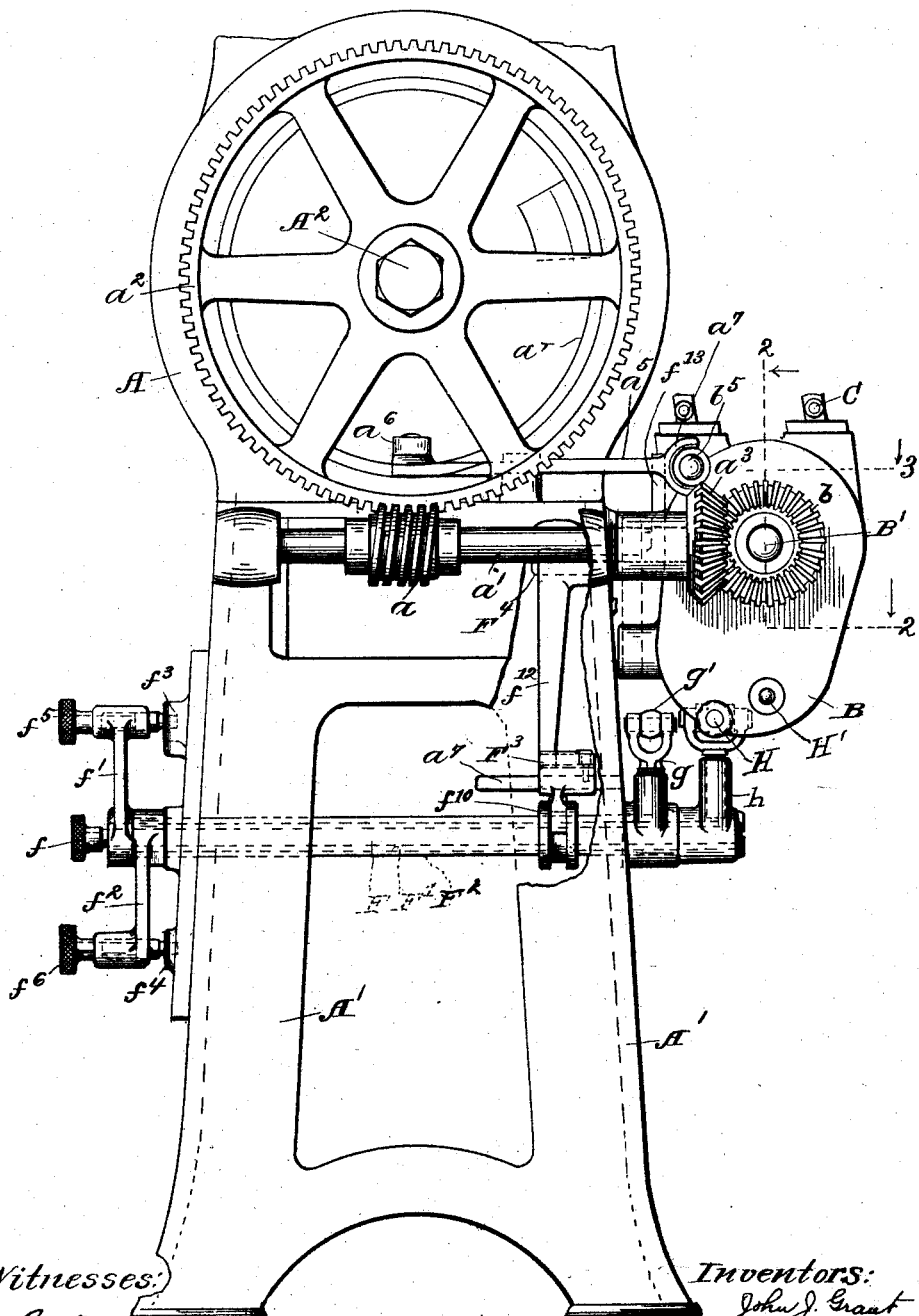

J. J. GRANT & J. F. FIEG.
CHANGE SPEED GEAR MECHANISM.
APPLICATION FILED JUNE 21, 1907.

907,142.

Patented Dec. 22, 1908.
6 SHEETS—SHEET 1.

J. J. GRANT & J. F. FIEG.
CHANGE SPEED GEAR MECHANISM.
APPLICATION FILED JUNE 21, 1907.
907,142.
Patented Dec. 22, 1908.
6 SHEETS—SHEET 2.
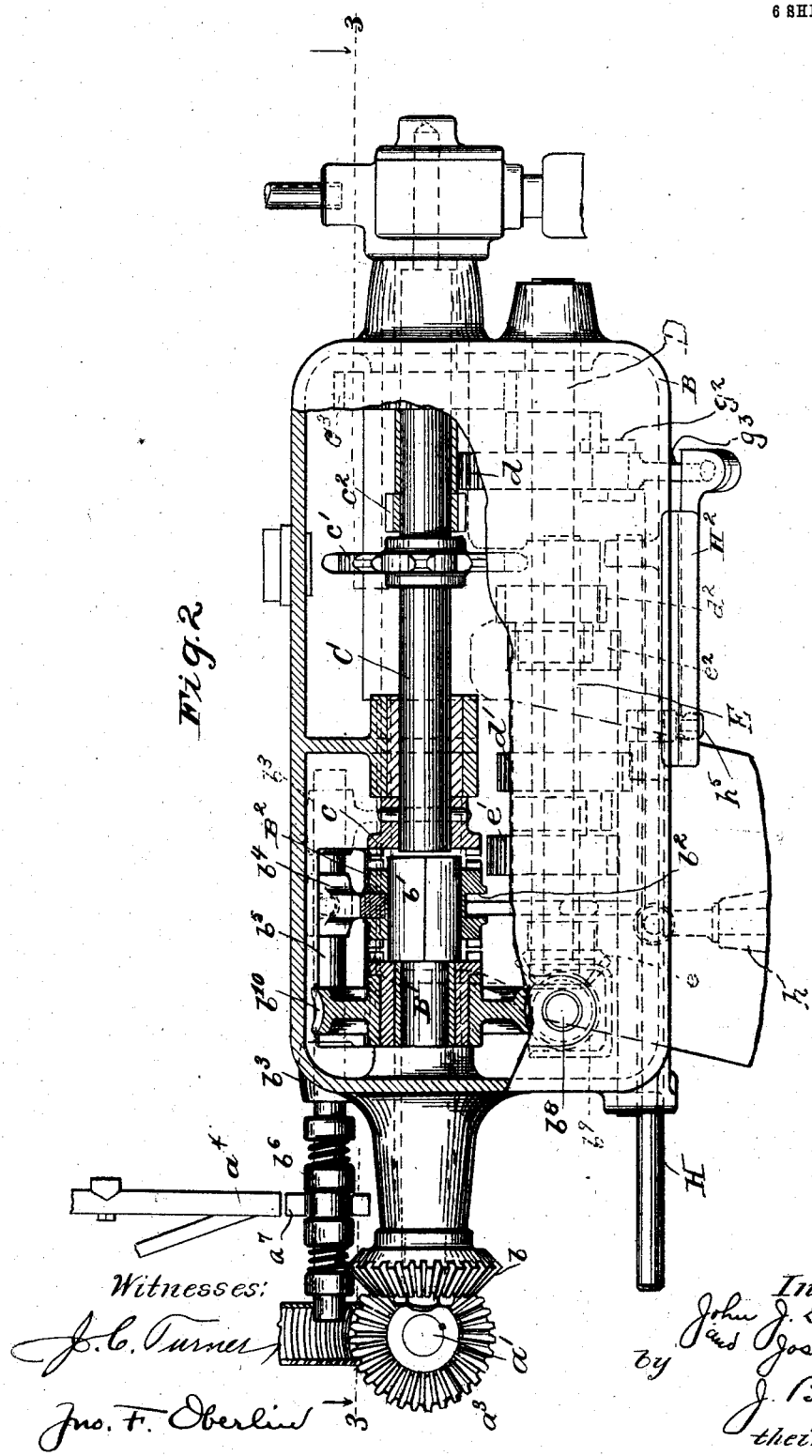

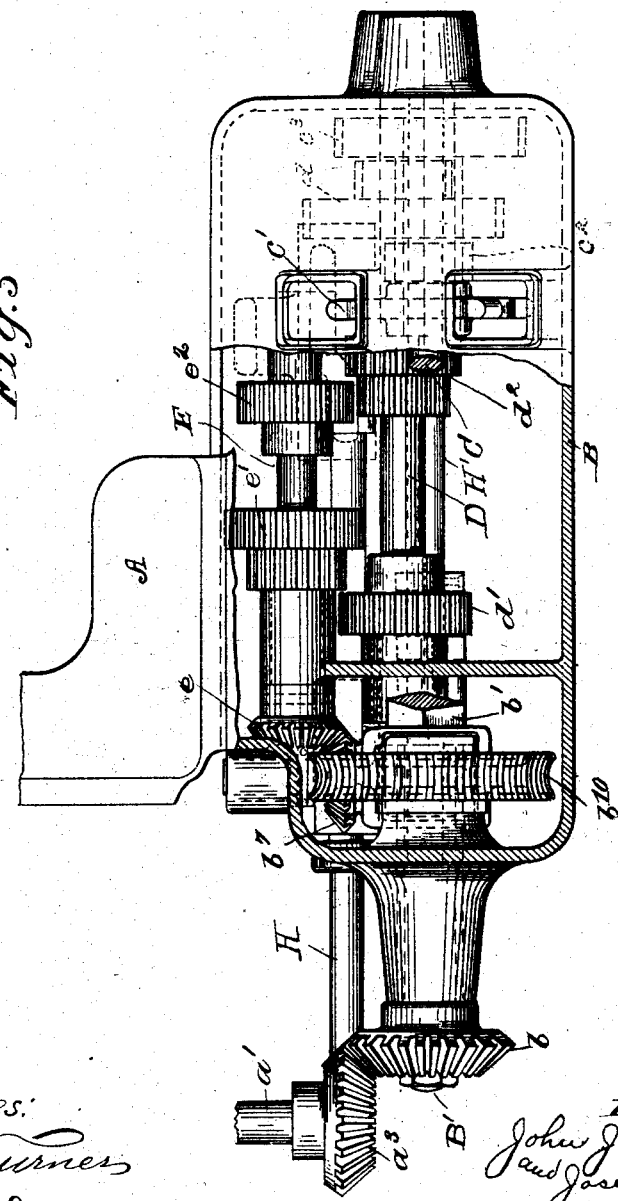

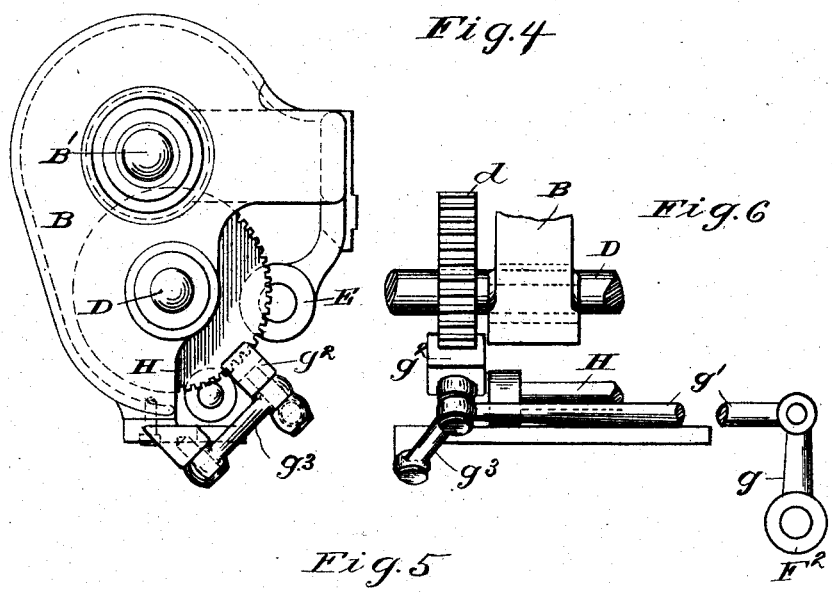
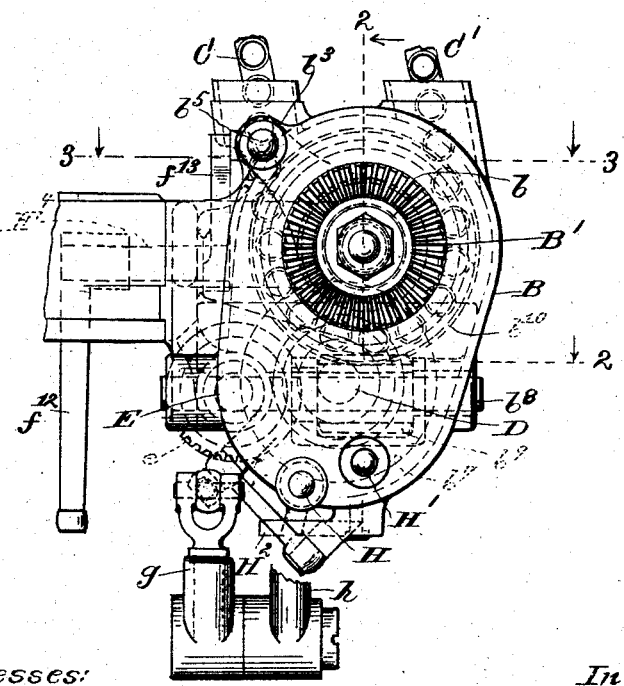

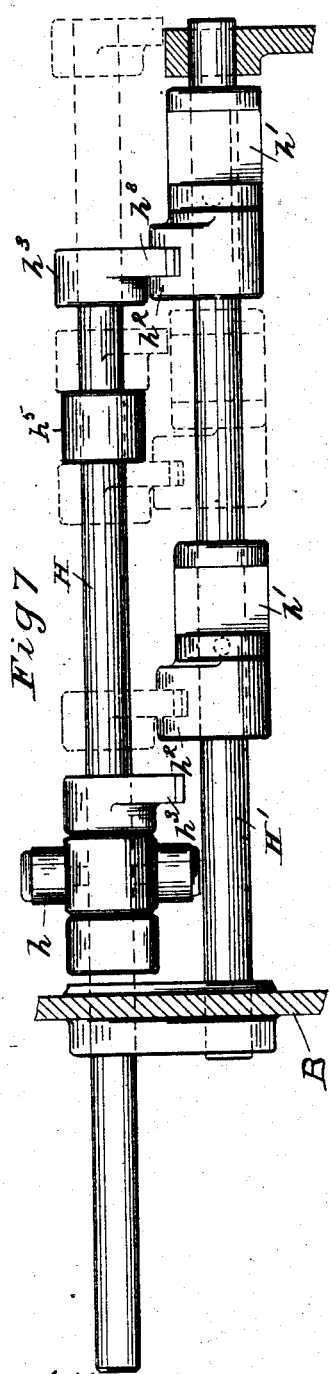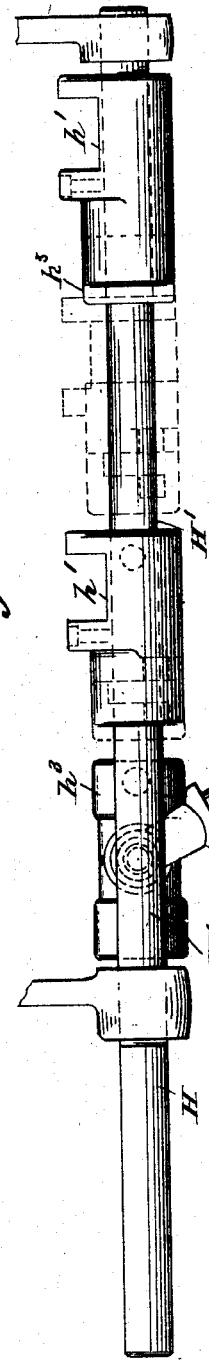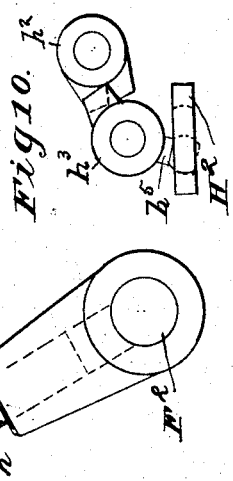

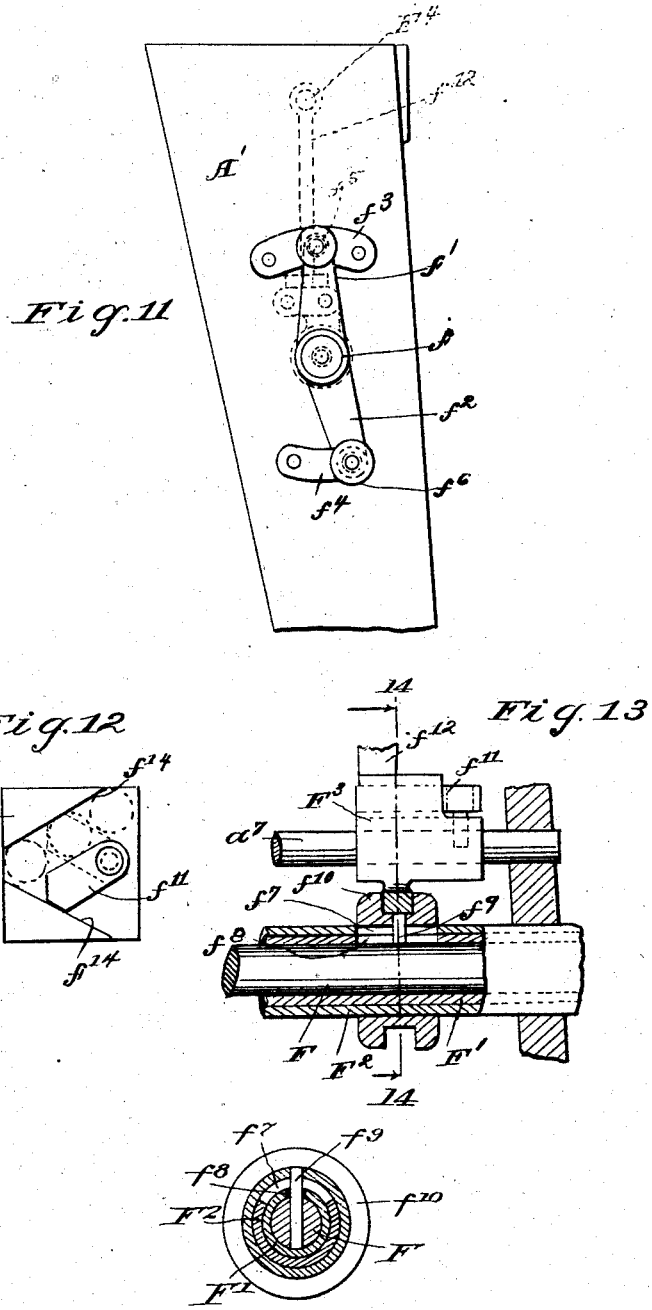

UNITED STATES PATENT OFFICE.

JOHN J. GRANT AND JOSEPH F. FIEG, OF CLEVELAND, OHIO, ASSIGNORS TO THE GRANT AUTOMATIC MACHINE COMPANY, OF CLEVELAND, OHIO, A CORPORATION OF OHIO.

CHANGE-SPEED GEAR MECHANISM.

No. 907,142.   Specification of Letters Patent.   Patented Dec. 22, 1908.

Application filed June 21, 1907. Serial No. 380,030.

*To all whom it may concern:*

Be it known that we, JOHN J. GRANT and JOSEPH F. FIEG, both citizens of the United States, residents of Cleveland, county of Cuyahoga, and State of Ohio, have invented a new and useful Improvement in Change-Speed Gear Mechanisms, of which the following is a specification, the principle of the invention being herein explained and the best mode in which we have contemplated applying that principle, so as to distinguish it from other inventions.

Our present invention relates to improvements in change speed gear mechanisms, such as are used in connection with automatic lathes and the like.

The object of said invention is the provision of a change speed gear mechanism that will be simple in construction and operation and that will be so arranged as to prevent the inadvertent shifting of the clutch into connection with the wrong feed when temporarily removed from such connection for purposes of adjustment or the like.

To the accomplishment of the above and related objects said invention consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings: Figure 1 represents a broken end elevation of an automatic lathe of the type in connection with which my improved change speed gear mechanism is intended to be employed, such mechanism likewise appearing in end elevation therewith; Fig. 2 is partly a rear elevation, and partly a section taken on the line 2—2, Fig. 1, of the gear mechanism removed from such machine; Fig. 3 is partly a plan, and partly a horizontal section on the line 3—3, Fig. 1, of such gear mechanism; Fig. 4 is an elevation of the end of such mechanism opposite the end shown in Fig. 1; Fig. 5 is an end elevation corresponding with that in Fig. 1, but on a larger scale and introducing details of construction not there shown; Fig. 6 is a front elevational view of the gear shifting mechanism for changing from high to low speed; Figs. 7 and 8 are respectively a plan and a front elevational view of the mechanism for shifting the gears in connection with the variable feed of the change speed gear mechanism; Fig. 9 is a plan view of a cam-plate forming a feature of such last named mechanism; Fig. 10 is a transverse section through such plate and mechanism; Fig. 11 is a front elevation of a portion of the machine frame located directly in front of the change speed gear mechanism; Figs. 12 and 13 are views showing details of the actuating means whereby such feed mechanism is engaged or disengaged; and Fig. 14 is a section taken on the line 14—14, Fig. 13.

The particular form of mechanism herein shown as an embodiment of our invention has been designed for use more especially with an automatic lathe of the kind described in a pending application of one of the present inventors, filed April 28, 1906, Serial No. 314,197, and such parts of the lathe or machine proper as appear in the several figures of the drawings are illustrative of such particular machine. It is not intended, however, to imply, by thus connecting our present invention with the machine just referred to, that such is the only use of the latter, for it as will be seen is equally adapted for use in connection with any machine of this general type. Of such machine there is here shown merely the bed frame A suitably supported on legs A'. In such bed frame is mounted the cam shaft $A^2$ whereby, as will be readily understood by those familiar with machines of this character, the several operative parts of the machine are designed to be actuated through the medium of suitable intermediate mechanisms not here shown, forming as they do no part of the present invention. Cam shaft $A^2$ requires to be driven at different rates of speed depending upon the character of the particular work in hand, such actuation being here had through a worm $a$ on a shaft $a'$ transversely mounted in the end of the machine frame A, such worm meshing with a worm gear $a^2$ secured on the outer projecting end of cam shaft $A^2$, Fig. 1. It will be further understood that within the particular rate of speed which may be chosen for the operation of cam shaft $A^2$, it is desirable to make further variations depending upon the particular stage of the operation of the parts actuated through such cam shaft. The change speed gear mechanism now about to be described is designed to afford means for securing such different general rates of speed and for securing within each of such general rates of speed such variations as it may be desirable to have available for the most rapid and efficient operation of the machine as a whole.

This mechanism is preferably mounted in a suitable case B secured to the rear side of machine frame A and adjacent to that end of such machine frame in which is mounted shaft $a'$ whereby the cam shaft $A^2$ is driven. Referring now more particularly to Figs. 2 and 3, such mechanism will be seen to comprise a driven element in the form of a short shaft B' bearing a beveled gear $b$ that meshes with a beveled gear $a^3$ upon the end of worm shaft $a'$. The inner end $b'$ of such shaft B' is squared and slidably mounted thereon is a clutch $B^2$ of usual type wherewith operative connection between said driven shaft and either of two drives, one a direct drive and the other a variable speed drive, is to be had. These drives will be described presently. Clutch $B^2$ is provided with an encircling groove $b^2$ that is engaged by the forked end of an actuating member $b^4$ mounted upon a rod $b^5$ reciprocably held in suitable bearings $b^3$ on the rear of the gear box B. Reciprocation of the rod, and thereby actuation of the clutch, is had from a cam wheel $a^4$ mounted upon cam shaft $A^2$ through an intermediate lever $a^5$ pivotally mounted upon the machine frame. Such lever bears at its inner end a roller $a^6$ adapted to be periodically engaged by the cam on the wheel $a^4$, and at its other end is provided with a fork $a^7$ engaged with a collar $b^6$ resiliently mounted upon the outerly projecting end of reciprocable shaft $b^5$, as shown in Fig. 2.

The direct drive of the gear mechanism comprises a shaft C in alinement with drive shaft B' and bearing at its end adjacent to the squared end of the latter a clutch member $c$ that is adapted to engage with the clutch $B^2$ mounted on such squared end. Direct drive shaft C is driven through a sprocket chain C' passing around a sprocket wheel $c'$ mounted thereon and over the main drive shaft (not shown) of the machine.

The variable speed drive of the change speed gear mechanism comprises two shafts D, E both parallel with shafts B' and C, and suitably journaled in the lower portion of the gear box. Such shafts D, E are adapted to be driven at different rates of speed from two gears $c^2$, $c^3$ mounted upon direct drive shaft C adjacent to the sprocket wheel $c'$ thereon. Connection between such first shaft D and the gears just named, respectively, is had through a double gear $d$ slidably mounted upon the corresponding end of said shaft, the smaller element of said double gear $d$ being adapted to engage with the larger $c^2$ of the gears on said drive shaft and vice versa, whereby obviously two different rates of speed may be communicated to said shaft D. Connection between the second E of said variable feed shafts and driven shaft B' is had by means of beveled gears, one $e$ of which is mounted on the outer end of such variable drive shaft, the other $b^7$ of which is mounted upon the end of a short transversely disposed worm shaft $b^8$, the worm $b^9$ of which meshes in turn with a worm gear $b^{10}$ rotatably mounted upon drive shaft B' between the end of the gear box or casing B and the squared portion $b'$ of such shaft. This worm gear bears on the face disposed adjacent to the squared portion in question teeth adapted to be engaged with the clutch member slidably mounted on such squared portion, thereby adapting it to actuate shaft B' when desired.

By means of suitable gearing now to be described, connection is had between the first and second of the variable speed shafts just referred to whereby for each of the speeds by which the shaft D is adapted to be driven through the optional connection had thereby with direct drive shaft C, three different rates of speed may be imparted to the second E of said shafts. To this end there are fixedly mounted upon shaft E near its outer end a double gear $e'$ and at its other end a single gear $e^2$, each of said three gears having a different number of teeth. Upon the shaft D is correspondingly mounted near its outer end a single gear $d'$ adapted to mesh with the smaller part of said double gear $e'$ and at the other end of shaft D is mounted sliding double gear $d^2$, the respective members of which are adapted successively to register with the adjacently disposed gear $e^2$ on said second shaft and with the larger part of the double gear $e'$ at the other end thereof. Having thus described the detailed construction of the gear change speed mechanism, proper, we shall now take up in turn the description of the actuating mechanism for controlling and shifting the various parts requiring adjustment. It is to this mechanism that particular attention is desired to be called.

Transversely mounted in the machine frame A, as shown in Figs. 1 and 11, are three shafts, one inner solid reciprocable shaft, or rod, F, Fig. 13, and, independently rotatable thereon, two tubular shafts, F' F². Upon the forward end of said inner shaft or rod F is mounted a suitable handle $f$ whereby the same may be longitudinally adjusted, while correspondingly mounted upon the ends of the two tubular shafts F' F² are levers $f'$ $f^2$ whereby the same may be rotated, provision being made to retain the lever mounted upon the inner tubular shaft in any one of three desired angular positions, that of the outer shaft in any one of two desired positions, by means of stops $f^3$ $f^4$ wherewith catches $f^5 f^6$ constituting the handles of such levers, respectively, are adapted to engage. Intermediately of their ends, and preferably, as shown, just within the rear portion of the machine frame, the two tubular shafts under consideration are provided with longitudinally extending slots, Fig. 13, the one $f^7$ in the outer shaft being wider than the other $f^8$ in the inner shafts. Through such slots projects a pin $f^9$ whereby collar $f^{10}$ slidably mounted upon the outermost of said tubular shafts is fixedly mounted in respect to the inner shaft or rod. By virtue of the arrangement and construction of the slots in the outer tubular shafts, however, it will be seen that rotation of the latter is in no wise interfered with by this construction. Mounted upon an arm $a^7$ projecting forwardly from the inside of the machine frame and just above the shafts F, F', F² is a block F³ that is provided with a forked arm extending downwardly and into engagement with a groove that encircles collar $f^{10}$. The upper face of said block, Fig. 12, is provided with two inwardly directed cam faces $f^{14}$ angularly disposed with respect to the line of movement of said block. Upon the upper face of said block intermediate between the two cam faces is pivotally mounted a fly $f^{11}$ that is adapted to lie parallel with each of the two cam faces respectively. Substantially in alinement with the slidable block just described is oscillatorily mounted in the upper portion of the machine frame a short shaft F⁴ to the inner end of which is rigidly secured a lever $f^{12}$ with its lower end depending in position to be engaged by the cam faces $f^{14}$ provided as aforesaid upon the upper face of such block. Reciprocation of the block, which, as has been indicated, may be effected by a corresponding movement of the inner solid shaft F, will be effective by virtue of this engagement, to oscillate the lever $f^{12}$ inwardly to a substantially vertical position from either of two possible extreme positions. The effect of the pivotally mounted fly $f^{11}$ on the face of the block is to render certain the return of such lever to the same angular position occupied by it, previously to its movement to such neutral position. Mounted upon the outer or rear end of shaft F⁴ is another short lever arm $f^{13}$, Figs. 1 and 5 the upper end of which had loose pivotal engagement with the reciprocable shaft $b^5$ whereby, it will be remembered, clutch B² on driven shaft B' is positioned. The adjustment of levers $f^{12}$, $f^{13}$ relatively to each other is such as to maintain said clutch in its neutral position, out of engagement, in other words, with both the direct and variable speed drives, when lever $f^{12}$ is moved to its neutral position in the manner just described.

Upon the rear end of tubular shaft F² is mounted a lever $g$ the upper end of which is joined by means of a suitable connecting rod $g'$ with gear shifting mechanism shown in Figs. 4 and 6 for actuating the gear $d$ whereby the high and low speed connection between drive shaft C and variable speed shaft D is had. Said shifting mechanism comprises simply a fork $g^2$ spanning the gear $d$, such fork being borne on the outer end of a short link or lever $g^3$ mounted on the under side of the gear box, Fig. 4. Similarly mounted on the rear end of the inner one F' of the two tubular shafts, is a lever arm $h$ the free end of which is connected with a shaft H both rotatably and reciprocably mounted in the lower portion of the gear box and parallel with the two variable speed drive shafts D and E. Adjacent to this shaft H and just below the first of the variable feed shafts is another shaft H' fixedly mounted in said box. Upon the latter are mounted forked blocks $h'$ respectively spanning the two gears $d'$ $d^2$ described as being reciprocably mounted on shaft D. In addition to the forks, whereby, engagement with the gears in question is had, each block $h'$ is provided with a lateral projecting lug $h^2$ likewise forked and adapted to be engaged by a corresponding lug $h^3$ borne upon shaft H. The lugs $h^3$, there being two involved in the present device inasmuch as two blocks $h'$ are employed, are angularly related to each other and are adapted upon proper rotation and longitudinal adjustment of shaft H to engage forks $h^2$, respectively. Longitudinal adjustment of the shaft is had through tubular shaft F' by the connections described above; and the necessary rotation thereof is effected incidentally to such longitudinal reciprocation by means of a cam groove $h^4$ in a plate H² secured to the underside of the gear box B, wherewith a lug or pin $h^5$ on shaft H engages. The disposition of the several parts and the conformation of cam-groove $h^4$ are such as to cause lugs $h^3$ to engage forks $h^2$ successively in the direction in which shaft H is being moved, the other one being simultaneously released.

The construction just described constitutes in effect a selective mechanism whereby we obviate the necessity heretofore existing of providing for the actuating shaft H or its equivalent, a range of longitudinal movement equal to the aggregate of the several distances through which it is required to shift the speed changing gears. Not only does this render the adjustment of the mechanism simpler and therefore easier, but it also permits of a much more compact arrangement of the change speed gear mechanism as a whole, a result the desirability of which need not be here emphasized. Combined with the foregoing are the features of construction and operation that characterize the clutch retaining device, to which attention has already been directed, the whole rendering our speed changing mechanism much superior to those ordinarily employed.

The operation of the several parts entering into the machine may now be briefly reviewed. Drive-shaft B' is designed to be alternately connected with shaft C, of the direct high-speed driving mechanism, and with gear $b^{10}$ of the variable low-speed driving mechanism, by the shifting of clutch member $B^2$, such shifting being effected automatically by the cam, or cams, on wheel $a^4$ in the usual fashion. When it is desired to temporarily hold clutch $b^2$ out of operative connection with either shaft C or gear $b^{10}$, this is effected by drawing forwardly upon rod F by means of handle $f$, such forward movement resulting in swinging to a neutral position the lever $f^{12}$ whereby operation of the clutch is controlled. The springs on either side of collar $b^6$ permit of rotation of cam-wheel $a^4$ without disturbing clutch $b^2$, when thus held inoperative.

Depending upon the character of the work in hand, it may be desirable to use different low speeds at different times. The operation of the selective mechanism for shifting the gears in the gear-box to effect different combinations thereof and thus secure the desired low speed, has just been explained and hence need not be dwelt upon further. The levers $f'$ $f^2$, by means of which actuation of the selective mechanism is had, are conveniently grouped adjacent to the handle $f$ for moving clutch $b^2$ to its neutral position. The entire control of the machine is thus placed within easy reach, the various parts being operable by a single hand. It has already been pointed out how that, when the machine has been stopped by drawing out rod F, and it is again desired to start the same, such starting cannot by accident or design be at the high speed of the direct drive if the machine was running at low speed when stopped, nor vice versa, at low speed, if the machine had been running at high.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. In mechanism of the class described, the combination of direct high-speed driving mechanism, variable low-speed driving mechanism, a clutch shiftable into working relation with said mechanisms respectively, and means adapted to move and hold said clutch in a neutral inoperative position, said means being arranged and constructed to return said clutch into operative connection with the driving mechanism from which it had been moved.

2. In mechanism of the class described, the combination of direct high-speed driving mechanism, variable low-speed driving mechanism, a clutch shiftable into working relation with said mechanisms respectively, automatic clutch-shifting mechanism, and manually operable means for moving and holding said clutch in a neutral inoperative position, said means being arranged and constructed to return said clutch into operative connection with the driving mechanism from which it had been moved.

3. In mechanism of the class described, the combination of direct high-speed driving mechanism, variable low-speed driving mechanism, a clutch shiftable into working relation with said mechanisms respectively, and means for moving and holding said clutch in a neutral inoperative position, such means including a lever, and a reciprocable cam member adapted to engage the free end of said lever to oscillate the latter.

4. In mechanism of the class described, the combination of direct high-speed driving mechanism, variable low-speed driving mechanism, a clutch shiftable into working relation with said mechanisms respectively, and means for moving and holding said clutch in a neutral inoperative position, such means including a lever, and a reciprocable block provided with angularly disposed inwardly directed cam faces adapted to engage the free end of said lever to oscillate the latter irrespective of its position.

5. In mechanism of the class described, the combination of direct high-speed driving mechanism, variable low-speed driving mechanism, a clutch shiftable into working relation with said mechanisms respectively, and means for moving and holding said clutch in a neutral inoperative position, such means including a lever, a reciprocable block provided with converging, inwardly directed cam faces adapted to engage the free end of said lever to oscillate the latter irrespective of its position, and a fly pivotally mounted on said block between said cam faces and adapted to lie substantially parallel therewith respectively to guide such lever end.

6. In mechanism of the class described, the combination of direct high-speed driving mechanism; variable low-speed driving mechanism; a clutch shiftable into working relation with said mechanisms respectively; gear shifting means in connection with said variable low-speed drive; means for moving and holding said clutch in a neutral inoperative position, such means including a lever; a reciprocable shaft disposed transversely of the path of oscillation of said lever; a tubular shaft rotatably mounted upon said reciprocable shaft, and operatively connected with said gear shifting means; and a slidable block connected with said reciprocable shaft through said tubular shaft and provided with angularly disposed inwardly directed cam faces adapted to engage the free end of said lever to oscillate the same.

7. In mechanism of the class described, the combination of direct high-speed driving mechanism; variable low-speed driving mechanism; a clutch shiftable into working relation with said mechanisms respectively; gear shifting means in connection with said variable low-speed drive; means for moving and holding said clutch in a neutral inoperative position, such means including a lever; a reciprocable shaft disposed transversely of the path of oscillation of said lever; a tubular shaft rotatably mounted upon said reciprocable shaft, and operatively connected with said gear shifting means; a grooved collar slidably mounted upon said tubular shaft and connected through the latter with said reciprocable shaft; a slidably supported fork engaging said collar and bearing a block provided with angularly disposed inwardly directed cam faces adapted to engage the free end of said lever to oscillate the same; and a fly pivotally mounted upon said block between said cam faces and adapted to be substantially parallel therewith respectively to guide such lever end.

8. The combination with gears, of shifting mechanism therefor comprising slidably supported members in engagement with the respective gears, and a member reciprocably mounted adjacent to aforesaid members, said last named member being automatically operable incidentally to its reciprocation to engage with said first named members respectively.

9. The combination with gears, of shifting mechanism therefor comprising slidably supported members in engagement with the respective gears, a member reciprocably mounted adjacent to aforesaid members, said last named member being angularly adjustable about its line of movement to engage said first named members respectively, and means adapted automatically to effect such adjustment incidentally to the reciprocation of such shaft.

10. The combination with gears, of shifting mechanism therefor comprising slidably supported members in engagement with the respective gears, a shaft reciprocably mounted adjacent to said members, said shaft bearing a lug adapted upon proper angular adjustment of the shaft to engage and actuate said members respectively, and means adapted automatically to effect such adjustment incidentally to the reciprocation of said shaft.

11. The combination with gears, of shifting mechanism therefor comprising slidably supported members in engagement with the respective gears, a shaft reciprocably mounted adjacent to said members, said shaft bearing a lug adapted upon proper angular adjustment of the shaft to engage and actuate said members respectively, a cam disposed alongside said shaft and a second lug mounted upon said shaft, and engaging said cam, the latter being adapted to oscillate said shaft upon reciprocation thereof to thus position said first lug.

12. The combination with gears, of shifting mechanism therefor comprising a fixed shaft, a second shaft parallel therewith and both reciprocably and rotatably mounted, forked blocks slidably mounted upon said fixed shaft and engaging the respective gears, said movable shaft bearing spaced lugs angularly related with respect to each other and adapted upon proper rotation of said shaft to engage said blocks respectively, a plate disposed alongside said movable shaft and provided with a cam-groove, and another lug borne by said shaft and engaging said groove, whereby upon reciprocation of said shaft it is likewise rotated.

Signed by JOHN J. GRANT, this 19th day of March, 1907.

JOHN J. GRANT.

Attested by—
 MARY ISRAEL,
 JNO. F. OBERLIN.

Signed by JOSEPH F. FIEG, this 15th day of June, 1907.

JOSEPH F. FIEG.

Attested by—
 MARY ISRAEL,
 E. R. RODD.